United States Patent
Martinez Gutierrez

(10) Patent No.: US 12,124,486 B2
(45) Date of Patent: *Oct. 22, 2024

(54) SYSTEMS AND METHODS FOR GENERATING DYNAMIC HUMAN-LIKE CONVERSATIONAL RESPONSES USING A MODULAR ARCHITECTURE FEATURING LAYERED DATA MODELS IN NON-SERIAL ARRANGEMENTS WITH GATED NEURAL NETWORKS

(71) Applicant: Citibank, N.A., New York, NY (US)

(72) Inventor: Joenteny David Martinez Gutierrez, Clute, TX (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,944

(22) Filed: Dec. 1, 2023

(65) Prior Publication Data

US 2024/0289359 A1    Aug. 29, 2024

Related U.S. Application Data

(63) Continuation of application No. 18/175,205, filed on Feb. 27, 2023, now Pat. No. 11,836,168.

(51) Int. Cl.
*G06F 16/00* (2019.01)
*G06F 11/34* (2006.01)
*G06F 16/332* (2019.01)
*G06F 40/40* (2020.01)

(52) U.S. Cl.
CPC ...... *G06F 16/3325* (2019.01); *G06F 11/3409* (2013.01); *G06F 16/3329* (2019.01); *G06F 40/40* (2020.01)

(58) Field of Classification Search
CPC .. G06F 16/3325; G06F 16/3329; G06F 40/40; G06F 11/3409
USPC .......................................................... 707/759
See application file for complete search history.

(56) References Cited

U.S. PATENT DOCUMENTS

| | | | | |
|---|---|---|---|---|
| 10,679,012 | B1* | 6/2020 | Salimov | G06N 3/088 |
| 11,238,239 | B2* | 2/2022 | Liu | G06V 40/25 |
| 2019/0251169 | A1* | 8/2019 | Loghmani | G06F 40/295 |
| 2021/0312277 | A1* | 10/2021 | Prabhudesai | G06F 11/3466 |

* cited by examiner

*Primary Examiner* — Monica M Pyo
(74) *Attorney, Agent, or Firm* — Foley & Lardner LLP

(57) ABSTRACT

Systems and methods for providing an artificial intelligence-based solution in a dynamic environment that requires models with varying degrees of nuance and specialization. One such dynamic environment relates to generating dynamic human-like conversational responses based on complex data. In particular, systems and methods recite generating dynamic human-like conversational responses using a modular architecture featuring layered data models with gated neural networks. The modular architecture compartmentalizes the various components and functions of an application. That is, the architecture may support multiple layers, each featuring models performing specific functions and/or having been trained on using specific data and/or algorithms.

16 Claims, 5 Drawing Sheets

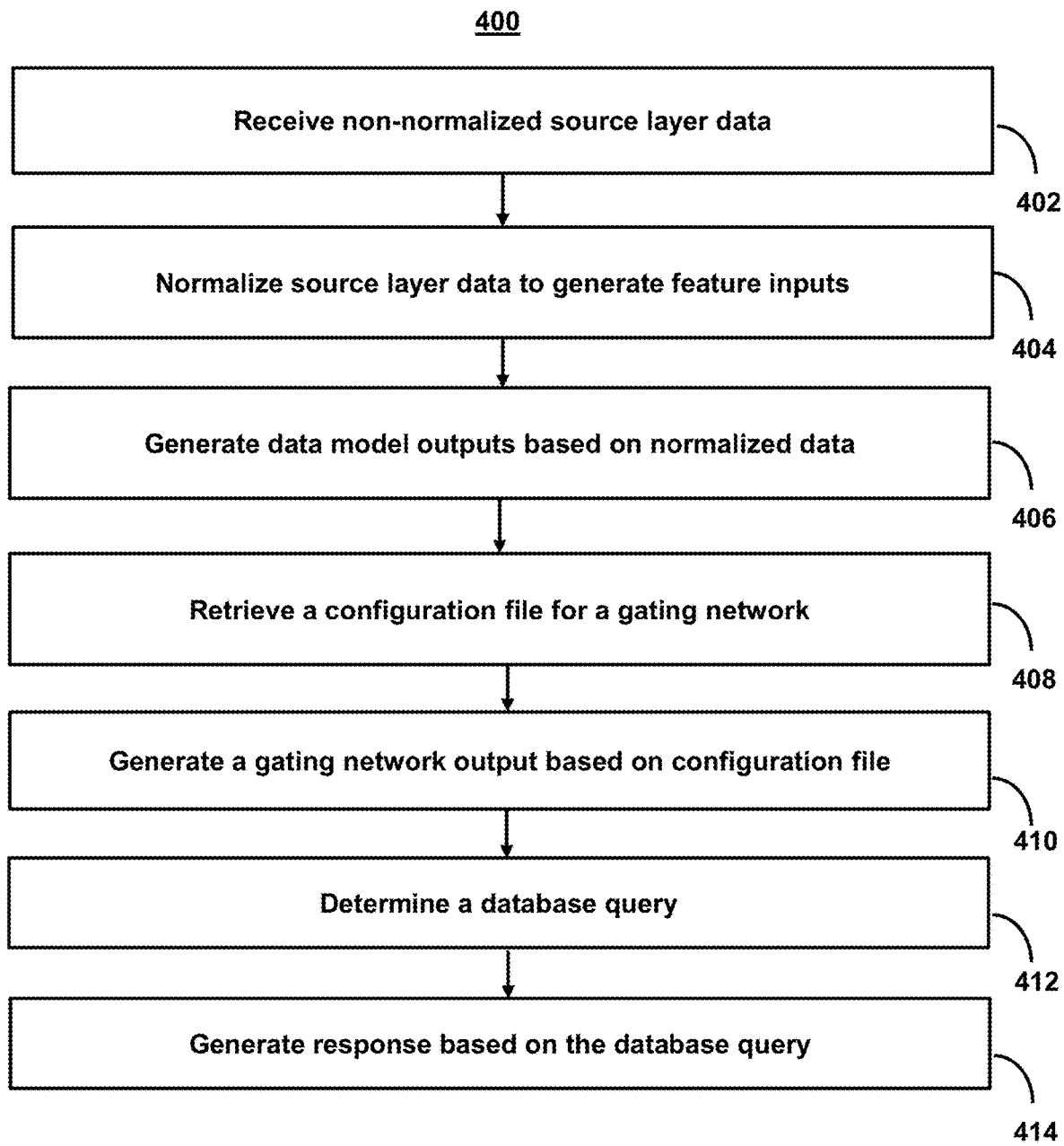

SYSTEMS AND METHODS FOR GENERATING DYNAMIC HUMAN-LIKE CONVERSATIONAL RESPONSES USING A MODULAR ARCHITECTURE FEATURING LAYERED DATA MODELS IN NON-SERIAL ARRANGEMENTS WITH GATED NEURAL NETWORKS

CROSS-REFERENCE TO RELATED APPLICATION(S)

This application is a continuation of U.S. patent application Ser. No. 18/175,205, filed Feb. 27, 2023. The content of the foregoing application is incorporated herein in its entirety by reference.

BACKGROUND

Artificial intelligence, including, but not limited to, machine learning, deep learning, etc. (referred to collectively herein as artificial intelligence models, data models, machine learning models, or simply models), has excited the imaginations of both industry enthusiasts as well as the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless.

However, despite these benefits and despite the wide-ranging number of potential uses, practical implementations of artificial intelligence have been hindered by several technical problems. First, artificial intelligence typically relies on training a model to make predictions and/or perform functions. Such training requires large amounts of high-quality data through which historical patterns may be detected. The process for obtaining this data and ensuring it is high-quality is often complex and time-consuming. Second, results based on artificial intelligence are notoriously difficult to review as the process by which the results are made may be unknown or obscured. This obscurity creates hurdles for identifying errors in the results, as well as improving the models providing the results. These technical problems present an inherent problem with attempting to use an artificial intelligence-based solution for providing results that may be based on different sets of training data and/or require dynamically selected models with varying degrees of nuance and required specialization.

SUMMARY

Systems and methods are described herein for novel uses and/or improvements to artificial intelligence applications. As one example, systems and methods are described herein for providing an artificial intelligence-based solution in a dynamic environment that requires models with varying degrees of nuance and specialization. One such dynamic environment relates to generating dynamic human-like conversational responses based on complex data.

For example, existing applications that generate dynamic human-like conversational responses are limited to the corpus of vocabulary upon which a model is trained. Such an approach is acceptable when the subject matter of the human-like conversational responses mirrors that of the data upon which the models were trained, but in instances where a response may require complex or specialized subject matter for which a model has not (or cannot) be trained, existing applications cannot provide adequate interpretations of request, analyze data to generate responses, and/or provide responses in a format that is useful to users.

One approach to this problem would be to increase the scope of the training. That is, a model that is trained to generate dynamic human-like conversational responses may be further trained to generate those responses on specific types of data. However, such an end-to-end approach is not only conceptually difficult, but it also requires access to the various specific types of data, which may not be publicly or practically available. In contrast to this approach, the systems and methods use a modular architecture.

The modular architecture compartmentalizes the various components and functions of an application. That is, the architecture may support multiple layers, each featuring models performing specific functions and/or having been trained on using specific data and/or algorithms. However, using a modular architecture creates a novel technical problem. Specifically, as the training data, functions, and/or algorithms used for each modular component may vary, there is no assurance that the inputs and/or outputs from one component may be compatible with the inputs and/or outputs from another component. To overcome this technical problem, the systems and methods introduce a normalization layer between different components. That is, the normalization layer is trained to determine the input/output of a given component and normalize that input/output into one which is compatible with another component and/or the architecture at large.

However, even the ability of multiple components to interact with each other does not fully empower the modular architecture, as it does not address when or if a given component should interact with another component. For example, in a serial architecture where an output from one model flows directly into an input of another, addressing when or if a given component should interact with the next component does not create a technical challenge. As the architecture evolves into a non-serial web of complex and/or structured data layers, determining when or if a given component should interact with another component creates a fundamental technical challenge to the functioning of the modular architecture. To overcome this technical problem, the modular architecture uses a gating network. For example, the gating network may determine when to use one layer and/or component (or an input/output thereof) versus another layer and/or component (or an input/output thereof).

Having solved the technical problems of allowing a modular component to interact as well as determine when to interact, the system may introduce multiple different components and/or layers that are each specifically trained to perform specific functions, trained on specific data and/or use specific algorithms. For example, the modular architecture may use a chatbot application component to receive requests for complex data modeling systems, a normalization layer to interpret the request, a gating network to select one or more data modeling components to analyze data to service the requests, and/or the same (or different chatbot application) to provide a response based on the analyzed data.

In some aspects, systems and methods for generating dynamic human-like conversational responses using a modular architecture featuring layered data models with gated neural networks are described. For example, the system may receive a first portion of non-normalized source layer data for a first data model, wherein the first data model comprises an aggregated subset of additional data models. The system may receive a second portion of the non-normalized source layer data for a second data model. The system may receive a third portion of the non-normalized source layer data for a third data model. The system may determine, by processing each respective portion through a first normalization layer, a first feature input for the first data model based on the first portion, a second feature input for the second data model based on the second portion, and a third feature input for the third data model based on the third portion. The system may input the first feature input into the first data model, the second feature input into the second data model, and the third feature input into the third data model to generate respective outputs. The system may retrieve a first configuration file for a gating network from a first configuration layer, wherein the first configuration file defines one or more parameters for the gating network. The system may input the first output, the second output, and the third output into the gating network to generate a gating network output based on the one or more parameters. The system may determine, based on the gating network output, a database query. The system may generate a dynamic human-like conversational response based on the database query.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in generating dynamic human-like conversational responses using a modular architecture featuring layered data models with gated neural networks, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
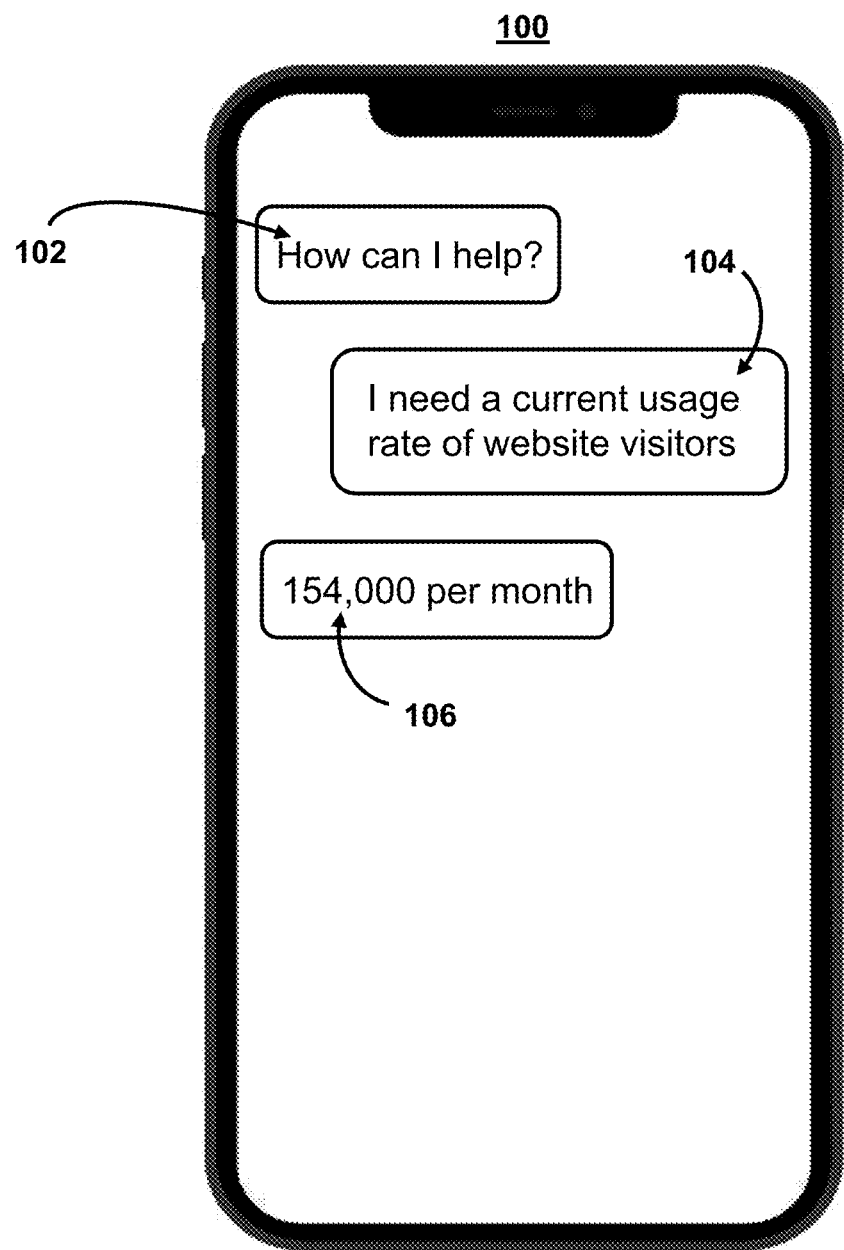
FIG. 1 shows an illustrative user interface for generating dynamic human-like conversational responses, in accordance with one or more embodiments.

FIG. 1 shows an illustrative user interface for generating dynamic human-like conversational responses, in accordance with one or more embodiments. As referred to herein, a "user interface" may comprise a human-computer interaction and communication in a device and may include display screens, keyboards, a mouse, and the appearance of a desktop. For example, a user interface may comprise a way a user interacts with an application or a website. User interface 100 (and the embodiments described herein) may generate a response that comprises content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same.

For example, FIG. 1 shows user interface 100. The system (e.g., a mobile application) may generate and respond to user interactions in a user interface (e.g., user interface 100) as part of a dynamic human-like conversation. The dynamic human-like conversation may include a back-and-forth exchange of ideas and information between the system and the user. The dynamic human-like conversation may proceed through one or more mediums (e.g., text, video, audio, etc.). The system may provide human-like communications and/or create applications that mimic the tone, cadence, and speech patterns of humans. In order to fulfill user-interaction requirements, the system needs to be helpful and respond intelligently by providing relevant responses to user inputs, whether these inputs are received via text, audio, or video input. For example, the system may use one or more artificial intelligence models, state machines, and/or other models.

In order to maintain the human-like conversation, the system may need to generate responses dynamically and/or in substantially real-time. For example, the system may generate responses within the normal cadence of a conversation. In some embodiments, the system may continually determine the likely intent of the user in order to generate responses (e.g., in the form of prompts, notifications, and/or other communications) to the user. It should be noted that a response may include any step or action (or inaction) taken by the system, including computer processes, which may or may not be perceivable to a user.

For example, in response to a user action, which in some embodiments may comprise a user logging onto an application that generates user interface 100. In response to a user logging on, the system may generate a query (e.g., query 102). In response to a user inputting a query (e.g., query 104) into user interface 100, the system may then generate a response (e.g., response 106). The system may continue to receive queries (and responses thereto) as well as generate responses and/or queries.

In order to maintain the dynamic nature of the queries and/or responses, the system may use one or more models. These models may execute a series of steps that may generate content quickly and accurately to maintain a cadence of a normal conversation with a user. For example, the system may interpret requests, analyze data to generate responses, and/or provide responses in a format that is useful to users. These steps may include retrieving data about the user and/or subject matter of the query, retrieving data from one or more sources, performing an analysis of the data, which may include the dynamic selection of one or more models to perform the analysis, and/or other steps in order to generate a response. In some embodiments, the system may generate a plurality of responses.

In some embodiments, the system may receive a request for a database query from a chatbot application. For example, a chatbot or chatterbot may be a software application used to conduct an online chat conversation via text or text-to-speech in lieu of providing direct contact with a live human agent. Chatbots may be computer programs that are capable of maintaining a conversation with a user in natural language, understanding their intent, and/or replying based on preset rules and data. In some embodiments, the chatbots may be powered using artificial intelligence. The chatbot may be housed at an Application Programming Interface ("API") endpoint layer. For example, the system may receive, at the API endpoint layer, a dynamic human-like conversational request. The system may determine, at the API endpoint layer, a database request for the database query based on the dynamic human-like conversational request.

In some embodiments, the API endpoint layer (which may correspond to an API of one or more devices) may include one or more natural language processing applications in order to determine an intent of a user (e.g., a user issuing query 104). These applications may also combine user queries (e.g., the text of query 104) with user data in order to determine the intent of a user.

In some embodiments, the system may use the information in a query (e.g., query 104) and user data to generate a feature input for one or more models. The feature input may include a vector of values that describes various data about a user, a user action, and/or a current or previous interaction with the user. For example, a feature is an individual measurable property or characteristic of a user, a user action, and/or a current or previous interaction with the user. For example, the feature input may comprise a column of data (e.g., an input set) that represents characteristics of user data, which the system may use to select a conversation response. Alternatively or additionally, the system may include a feature input layer that receives the feature input and applies data normalization. The system may further select the information for inclusion in the feature input based on a predictive value. The information may be collected actively or passively by the system and compiled into a user profile.

In some embodiments, the user data (e.g., a user action) may include conversation details, such as information about a current session, including a channel or platform, e.g., desktop web, iOS, mobile, a launch page (e.g., the web page that the application was launched from), a time of launch, activities in a current or previous session before launching the application. The system may store this information, and all the data about a conversational interaction may be available in real-time via HTTP messages and/or through data streaming from one or more sources (e.g., via an API.).

In some embodiments, the user data (e.g., a user action) may include user account information, such as types of accounts the user has, other accounts on file, such as bank accounts for payment, information associated with accounts, such as credit limit, current balance, due date, recent payments, or recent transactions. The system may obtain this data in real-time for model prediction through enterprise APIs.

In some embodiments, the user data (e.g., a user action) may include insights about users, provided to the application (e.g., via an API) from one or more sources, such as qualitative or quantitative representations (e.g., a percent) of a given activity (e.g., online spending) in a given time period (e.g., six months), upcoming actions (e.g., travel departure, payday, leave and/or family event) for a user, information about third parties (e.g., merchants (ranked by the number of transactions) over the last year for the user), etc. Upon determining the intent of the user, the system may access a modular architecture (e.g., as described in FIGS. 2A and 2B) to generate a response (e.g., response 106) to the user query.

Figure 2A:
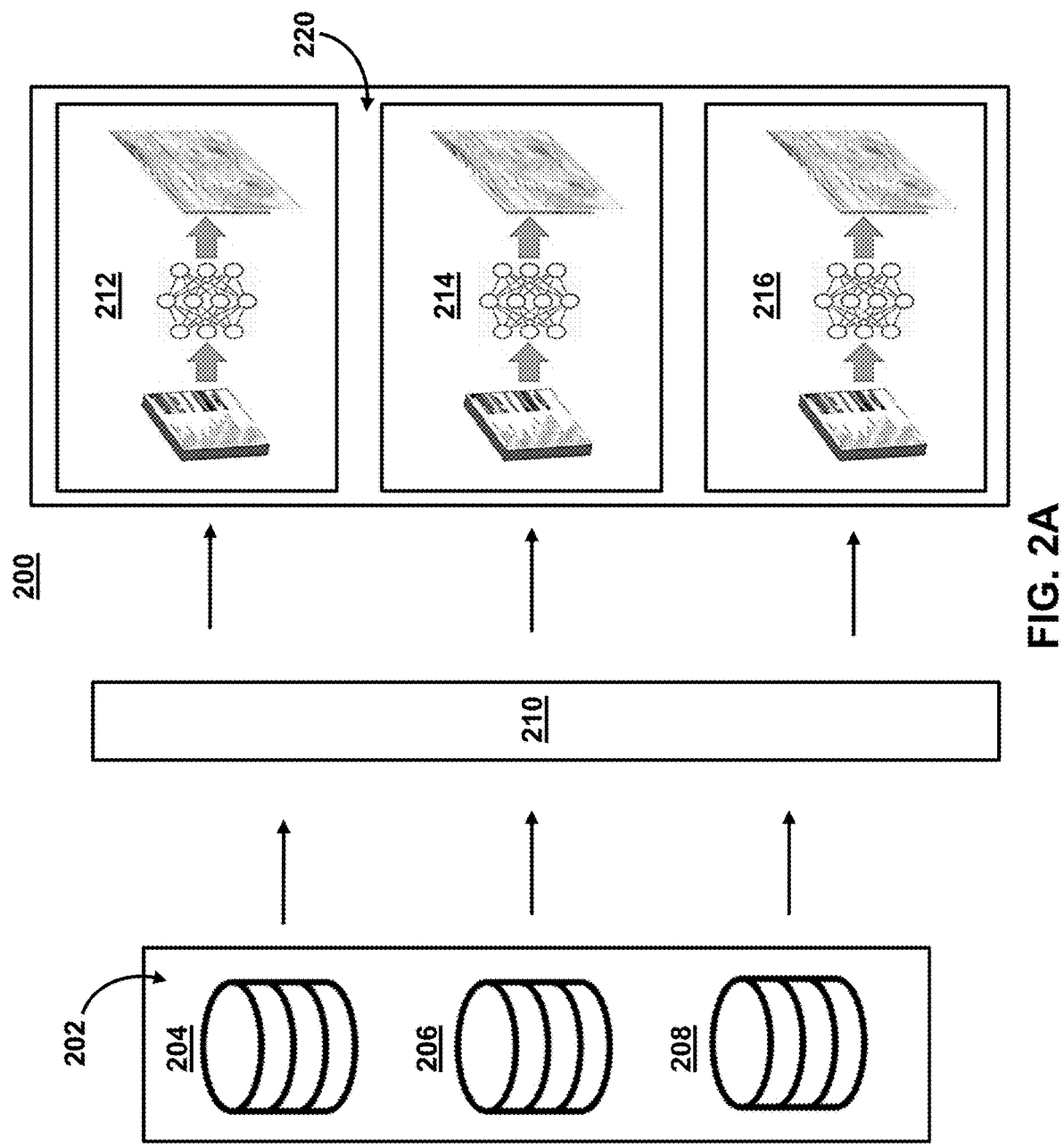
FIGS. 2A and 2B show an illustrative diagram for a modular architecture featuring layered data models with gated neural networks, in accordance with one or more embodiments.
Figure 2B:
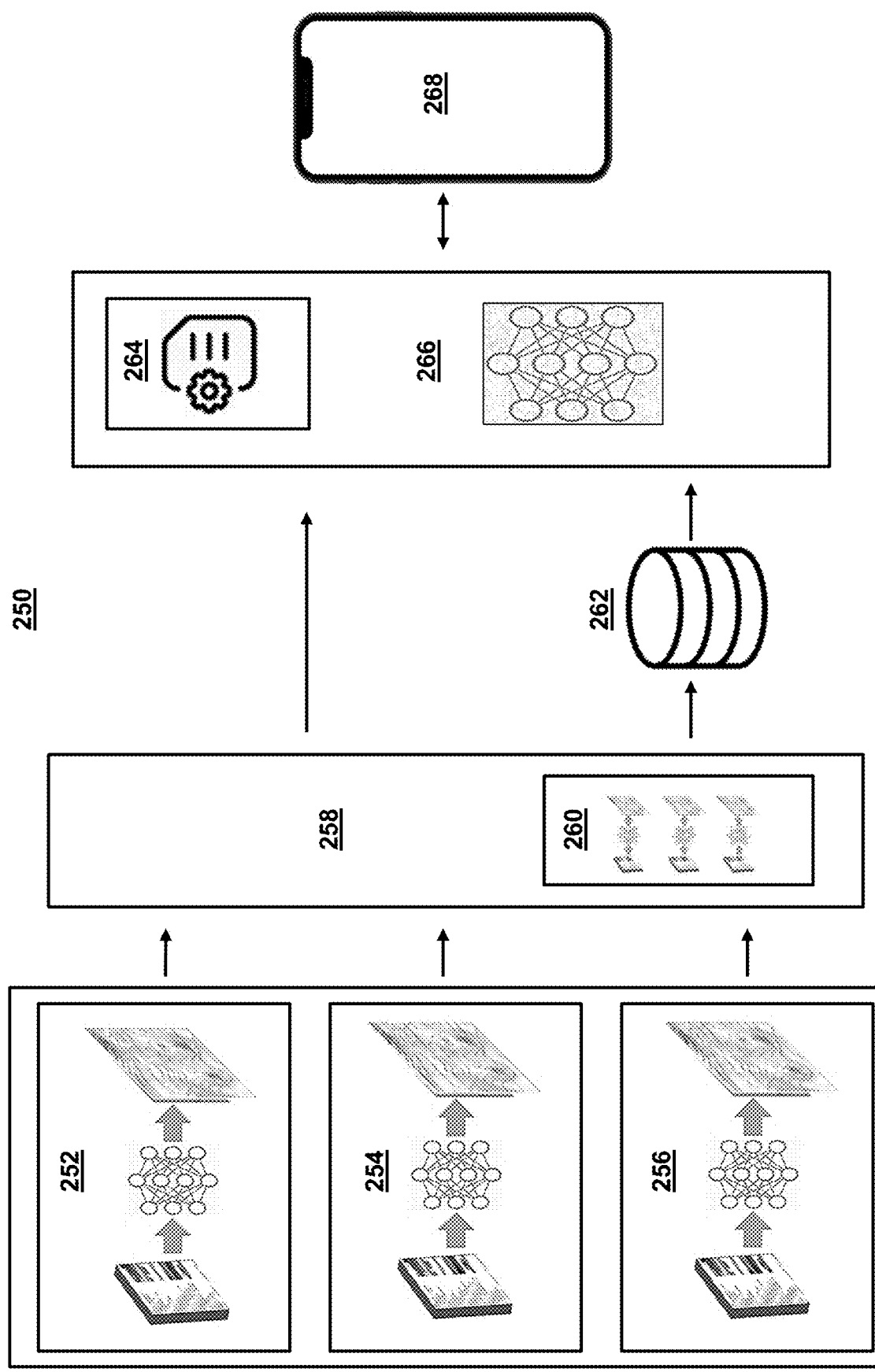

FIGS. 2A and 2B show an illustrative diagram for a modular architecture featuring layered data models with gated neural networks, in accordance with one or more embodiments. For example, FIGS. 2A and 2B, which show system 200 and system 250, respectively, may in some embodiments form a single modular architecture.

FIG. 2A shows system 200. System 200 includes a plurality of components. For example, system 200 may comprise a modular architecture (or a portion thereof) composed of one or more components. For example, modular architecture involves using the same module in multiple configurations, thus enabling a large variety of designs. In modular architecture, one component can replace or add to any other component without affecting the rest of the system. As described herein, a component may comprise a hardware or software component. For example, a modular component may comprise any items that work together to form a single functioning item and/or enable a computer function. In some cases, a modular component may have a complete function that it is able to perform when not connected to any other component.

System 200 includes data source layer 202, normalization layer 210, and data model layer 220. For example, system 200 may comprise a plurality of layers. These layers may in some embodiments correspond to layers in an Open Systems Interconnection ("OSI") model. For example, the system may comprise a plurality of layers such as an Application Layer, Presentation Layer, Session Layer, Transport Layer, Network Layer, Data Link Layer, and/or Physical Layer. The application layer is used by end-user software such as web browsers and email clients. It provides protocols that allow the software to send and receive information and present meaningful data to users. A few examples of application layer protocols are the Hypertext Transfer Protocol ("HTTP"), File Transfer Protocol ("FTP"), Post Office Protocol ("POP"), Simple Mail Transfer Protocol ("SMTP"), and Domain Name System ("DNS").

The presentation layer prepares data for the application layer. It defines how two devices should encode, encrypt, and compress data so it is received correctly on the other end. The presentation layer takes any data transmitted by the application layer and prepares it for transmission over the session layer. The session layer creates communication channels, called sessions, between devices. It is responsible for opening sessions, ensuring they remain open and functional while data is being transferred, and closing them when communication ends. The session layer can also set checkpoints during a data transfer-if the session is interrupted, devices can resume data transfer from the last checkpoint. The transport layer takes data transferred in the session layer and breaks it into "segments" on the transmitting end. It is responsible for reassembling the segments on the receiving end, turning it back into data that can be used by the session layer. The transport layer carries out flow control, sending data at a rate that matches the connection speed of the receiving device, and error control, checking if data was received incorrectly and, if not, requesting it again.

The network layer has two main functions. One is breaking up segments into network packets and reassembling the packets on the receiving end. The other is routing packets by discovering the best path across a physical network. The network layer uses network addresses (typically Internet Protocol addresses) to route packets to a destination node. The data link layer establishes and terminates a connection between two physically-connected nodes on a network. It breaks up packets into frames and sends them from source to destination. This layer is composed of two parts—Logical Link Control ("LLC"), which identifies network protocols, performs error checking, and synchronizes frames, and Media Access Control ("MAC") which uses MAC addresses to connect devices and define permissions to transmit and receive data. The physical layer is responsible for the physical cable or wireless connection between network nodes. It defines the connector, the electrical cable, or wireless technology connecting the devices, and is responsible for the transmission of the raw data, which is simply a series of 0s and 1s, while taking care of bit rate control.

Alternatively or additionally, the layers may correspond to a feature, function, and/or component of a modular architecture. For example, data source layer 202 may comprise one or more data sources. For example, a data source may be a location where the data that is being used originates from. A data source may be the initial location where data is born or where physical information is first digitized; however, even the most refined data may serve as a source as long as another process accesses and utilizes it. Data source layer 202 may comprise a component (or a layer of components) that provides data. In some embodiments, the system may receive a first portion of non-normalized source layer data from data source layer 202. For example, the data received from data source layer 202 may comprise data that has not yet been processed through normalization layer 210.

Data source layer 202 may provide data from numerous sources (e.g., data source 204, data source 206, and/or data source 208). For example, the system may receive a first portion of non-normalized source layer data for a first data model from data source 204, wherein the first data model comprises an aggregated subset of additional data models. Additionally or alternatively, the system may receive a second portion of the non-normalized source layer data from data source 206. For example, the system may receive a second portion of the non-normalized source layer data for a second data model. Additionally or alternatively, the system may receive a third portion of the non-normalized source layer data from data source 208. For example, the system may receive a third portion of the non-normalized source layer data for a third data model.

System 200 may then process data received from data source layer 202 at normalization layer 210. For example, data normalization may comprise organizing data entries to ensure they appear similar across all fields and records, making information easier to find, group, and analyze. In some embodiments, this may include creating tables and establishing relationships between those tables according to rules designed both to protect the data and to make the database more flexible by eliminating redundancy and inconsistent dependency. In some embodiments, this may include removing repeating groups of data, removing blank spaces and/or non-compliant characteristics, and/or other "cleansed" data.

In some embodiments, the normalization layer may process data based on hardware restrictions. For example, tensors are matrixes that are larger than 2 dimensions. GPU ("graphics processing unit") hardware is more efficient at processing this type of data. However, many systems (e.g., those processing large amounts of textual data and/or servicing chatbot applications) may rely on CPU ("computing processing unit") infrastructure. Thus, to effectively use models and/or train data for models with more than two dimensionality, CPU systems need to be replaced. As an alternative, the system may train the models for smaller dimensions in order to limit the size of matrixes and thus efficiently use legacy hardware. The system may achieve this by applying a tensor value. Tensor values may comprise numbers of a specific shape and a certain rank (dimensionality). Tensors are used in machine learning to represent input data and output data in models. By using the tensor value (and/or representing extra dimensionality via a tensor value), the system may use legacy hardware efficiently. For example, the system may use a Forward-Forward algorithm for this purpose. The Forward-Forward algorithm replaces the forward and backward passes of backpropagation with two forward passes, one with positive (i.e., real) data and the other with negative data, which could be generated by the network itself.

In some embodiments, characteristics of normalization may be defined by a configuration file. For example, a configuration file may define the parameters, options, settings, and/or preferences applied to operating systems (OSes), infrastructure devices, and applications in an IT context. The configuration file may also specify conditions and/or criteria for applying one or more parameters, options, settings, and/or preferences. For example, software and hardware devices can be profoundly complex, supporting myriad options and/or parameters. As such, the system may dynamically determine the best parameters to apply.

In some embodiments, the best parameters may be defined by one or more requirements. For example, the system may require the system to meet or enter one or more threshold requirements for database queries. The normalization layer may ensure that received data meets these requirements. For example, the threshold requirement for database queries may comprise one or more criteria required by the system to generate and/or serve a query. Such criteria may include a source of data, a time range, a domain, and/or other criteria. The system may determine whether these criteria are met. If not, the system may generate a recommendation (which may be expressed via a prompt) for updating the query and/or meeting the requirements.

For example, as the training data, functions, and/or algorithms used for each modular component may vary, there is no assurance that the inputs and/or outputs from one component may be compatible with the inputs and/or outputs from another component. To overcome this technical problem, the systems and methods introduce a normalization layer between different components. That is, the normalization layer may be trained to determine the input/output of a given component and normalize that input/output into one which is compatible with another component and/or the architecture at large.

In some embodiments, the normalization may be based on one or more models in data model layer 220. For example, the configuration file may specify particular criteria based on one or more data models in data model layer 220. For example, data model layer 220 may comprise one or more data models. For example, as shown in FIG. 2A, data model layer 220 comprises data model 212, data model 214, and data model 216. Data model layer 220 may feature models performing specific functions, having been trained on using specific data and/or using specific algorithms. Additionally or alternatively, data model layer 220 may comprise models that comprise a collection of other models and/or models with specific parameters, orders, weights, etc. For example, a data model may comprise an ensemble function. Ensemble learning refers to algorithms that combine the predictions from two or more models. For example, the system may use bagging, stacking, and/or boosting algorithms as the ensemble function.

For example, as shown in system 200, inputs (e.g., a first portion of data from a first plurality of data sources, a second portion of data from a second plurality of data sources, and a third portion of data from a third plurality of data sources) may be inputted into a plurality of data models (e.g., a first data model, a second data model, and a third data model). The ensemble function may combine the outputs from multiple base models (e.g., a first data model, a second data model, and a third data model) into a single score. For example, outputs from base-level models may be used as input features which may be used to train the ensemble function. In some embodiments, the ensemble function may be a linear combination of the base model scores.

FIG. 2B shows system 250. System 250 includes a plurality of components. For example, the plurality of components may illustrate model architecture for generating dynamic human-like conversational responses, in accordance with one or more embodiments. As shown in FIG. 2B, system 250 may receive outputs from a plurality of models in a data model layer (e.g., data model layer 220 (FIG. 2A)). The data model layer may comprise data model 252, data model 254, and data model 256 (which may correspond to data model 212, data model 214, and data model 216).

As shown in FIG. 2B, outputs from data model 252, data model 254, and data model 256 may be received at output layer 258. Output layer 258 may also comprise aggregator 260, which aggregates one or more outputs. For example, system 250 may process outputs from one or more data models. Aggregator 260 may include a softmax function or a normalized exponential function. The softmax function takes as input a vector z of K real numbers and normalizes it into a probability distribution consisting of K probabilities proportional to the exponentials of the input numbers. That is, prior to applying softmax, some vector components could be negative, or greater than one; and might not sum to 1; but after applying softmax, each component will be in the interval (0,1), and the components will add up to 1, so that they can be interpreted as probabilities. Furthermore, the larger input components will correspond to larger probabilities. By doing so, aggregator 260 may "score" each of the outputs of one or more data models and create an aggregated model.

Outputs from output layer 258 may be received by gating network 266 and/or data library 262. Data library 262 may comprise a collection of one or more data models and/or aggregations thereof. For example, the system may comprise a data model that is built upon other data models. For example, the system may use a data model that is retrieved from data library 262. Data library 262 may house a collection of data models that were previously used, previously aggregated, and/or designated for specific purposes.

Gating network 266 may receive the outputs from output layer 258 and/or data library 262. Gating network 266 may then generate a final classification. In some embodiments, gating network 266 may include ensemble prediction. For example, ensemble methods use multiple learning algorithms to obtain better predictive correlation than could be obtained from any of the constituent learning algorithms alone. Unlike a statistical ensemble in statistical mechanics, which is usually infinite, a machine learning ensemble consists of only a concrete finite set of alternative models but typically allows for a much more flexible structure to exist among those alternatives. Additionally, gating network 266 may include bootstrap aggregating and stacking.

Bootstrap aggregating, often abbreviated as bagging, involves having each model in the ensemble vote with equal weight. In order to promote model variance, gating network 266 trains each model in the ensemble using a randomly drawn subset of the training set. As an example, the random forest algorithm combines random decision trees with bagging to achieve very high classification accuracy. In bagging, the samples are generated in such a way that the samples are different from each other, however, replacement is allowed. Stacking (sometimes called stacked generalization) involves training a learning algorithm to combine the predictions of several other learning algorithms. First, all of the other algorithms are trained using the available data, and then a combiner algorithm is trained to make a final prediction using all the predictions of the other algorithms as additional inputs. If an arbitrary combiner algorithm is used, then stacking can theoretically represent any of the ensemble techniques described herein, although, in practice, a logistic regression model is often used as the combiner. Stacking may yield better correlation than any single one of the trained models.

Gating network 266 may rank potential responses by the probability of utility. In some embodiments, gating network 266 may determine a database query based on the first data model, the second data model, the third data model, and/or a combination thereof. Gating network 266 may determine the data model with the highest probability of responding to the database query. In response to determining the data model with the highest database query responsiveness, gating network 266 may use a given model output (e.g., a model that uses real-time averages) for generating a dynamic human-like conversational response from a plurality of dynamic human-like conversational responses.

In some embodiments, gating network 266 may comprise a gate for a neural network or another data model. For example, the gating network may comprise a gated neural network function that weights the respective outputs based on a coefficient defined by the one or more parameters. The gate in a neural network may act as a threshold for allowing the network to distinguish when to use normal stacked layers versus an identity connection. An identity connection uses the output of lower layers (e.g., the respective outputs of the second data model and the third data model) as an addition to the output of consecutive layers (e.g., the first data model). The gate may allow for the layers of the network to learn in increments rather than creating transformations from scratch. For example, the gate in the neural network is used to decide whether the network can use the shortened identity connections or if it will use the stacked layers.

In some embodiments, the gate in the neural network may use a coefficient used to define how much the network uses the identity connections over the stacked layers (e.g., the respective outputs of the second data model and the third data model versus the first data model). For example, instead of a traditional recurrent neural network architecture, with several sequential nodes, the gated recurrent unit uses several cells consecutively, each containing three models. A gated neural network uses known processes called update gate and reset gate. This allows the neural network to carry information forward across multiple units by storing values in memory. When a critical point is reached, the stored values are used to update the current state.

Gating network 266 may contain four main components: the update gate, the reset gate, the current memory unit, and the final memory unit. The update gate is responsible for updating the weights and eliminating the vanishing gradient problem. As the model learns, the model will continue to update the information to be passed to the future. The reset gate acts in an opposing way by deciding how much of the past information should be forgotten, given the current state.

In some embodiments, gating network 266 may comprise one or more models, such as an artificial intelligence model, which may include unsupervised or supervised learning. For example, the gating network may comprise a supervised database that comprises a gated recurrent unit.

For example, a gated recurrent unit ("GRU") is a gating mechanism in a recurrent neural network ("RNN") similar to a long short-term memory ("LSTM") unit but without an output gate. GRUs try to solve the vanishing gradient problem that can come with standard RNN. The GRU is a variation of the LSTM unit because both have a similar design and produce equal results in some cases. Using the GRU, the system is able to solve the vanishing gradient problem by using an update gate and a reset gate. For example, the vanishing gradient problem occurs in machine learning when the gradient becomes vanishingly small, which prevents the weight from changing its value.

The update gate controls the information that flows into memory, and the reset gate controls the information that flows out of memory. The update gate and reset gate are two vectors that decide which information will get passed on to the output. Furthermore, these gates may be trained to keep information from the past or remove information that is irrelevant to the prediction.

In some embodiments, the system may retrieve a configuration file for gating network 266 from configuration layer 264, wherein the configuration file defines one or more parameters for gating network 266. The configuration file may comprise one or more parameters that define and/or affect how gating network 266 operates. In some embodiments, the system may select different configuration files for applying to gating network 266. For example, the system may select which configuration file to use based on a request and/or query. For example, the system may select or use a different configuration file to allow for faster updates and/or changes. For example, retrieving the first configuration file for the gating network from the first configuration layer may comprise the system receiving a database request for the database query and selecting the first configuration file from a plurality of configuration files based on the database request.

As the modular architecture of system 250 evolves into a non-serial web of complex and/or structured data layers, determining when or if a given component should interact with another component creates a fundamental technical challenge to the functioning of the modular architecture. To overcome this technical problem, the modular architecture uses gating network 266. For example, gating network 266 may determine when to use one layer and/or component (or an input/output thereof) versus another layer and/or component (or an input/output thereof).

Gating network 266 may also receive information from API endpoint layer 268 (or a user interface and/or user device related thereto). For example, gating network 266 may receive data or metadata that may include data values, pageview information, text path, and page structure data. For example, a pageview (or pageview hit, page tracking hit) may be an instance of a page being loaded (or reloaded) in a browser. Text path information may indicate lines, shapes, and/or graphic elements that the text follows. Metadata may also include information on how the application and/or the website is set up, i.e., how the individual subpages are linked to one another. The system may generate data using image recognition and/or object recognition. For example, the system may determine a first user interface image corresponding to the first non-normalized data in the user interface. For example, the system may capture user interface image data, such as an image of a current user interface (and/or menus or features being accessed). The system may then apply computer vision techniques to determine metadata or a vector array corresponding to the image. For example, the system may employ computer vision tasks that include acquiring, processing, analyzing, and understanding digital images, and extraction of high-dimensional data from the real world in order to produce numerical or symbolic information, e.g., in the forms of decisions. To understand the context of the image, the system may transform visual images into descriptions of data. The system may then use this information to select responses, update data models and/or configuration files, etc. In some embodiments, system 250 may also comprise a normalization layer between API endpoint layer 268. For example, a normalization layer may receive non-normalized source layer data from a non-normalized data source with user interfaces (e.g., API endpoint layer 268) during a device session. The non-normalized source layer data may include metadata, which may be metadata related to non-normalized data.

Figure 3:
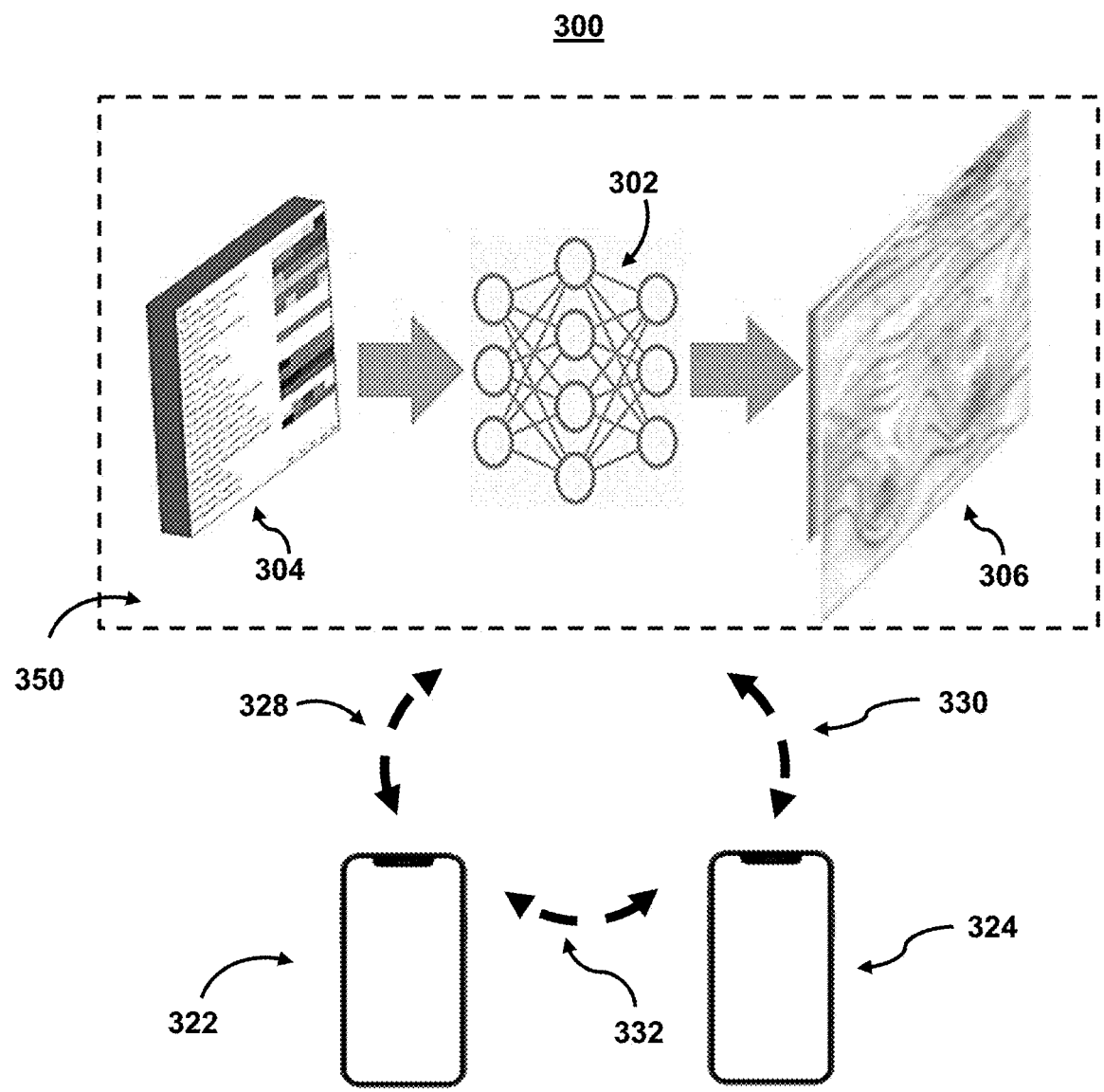
FIG. 3 shows illustrative components for a system used to dynamically select modular components for a modular architecture, in accordance with one or more embodiments.

FIG. 3 shows illustrative components for a system used to dynamically select modular components for a modular architecture, in accordance with one or more embodiments. As shown in FIG. 3, system 300 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system and may feature one or more component devices. It should be noted that while one or more operations are described herein as being performed by particular components of system 300, these operations may, in some embodiments, be performed by other components of system 300. As an example, while one or more operations are described herein as being performed by components of mobile device 324, these operations may, in some embodiments, be performed by cloud components. In some embodiments, the various computers and systems described herein may include one or more computing devices that are programmed to perform the described functions. Additionally or alternatively, multiple users may interact with system 300 and/or one or more components of system 300.

With respect to the components of mobile device 322 and mobile device 324, each of these devices may receive content and data via input/output I/O paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 300 also includes API layer 350. API layer 350 may allow the system to generate summaries across different devices. In some embodiments, API layer 350 may be implemented on mobile device 322 or mobile device 324. Alternatively or additionally, API layer 350 may reside on one or more of cloud components. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is a strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDoS protection, and API layer 350 may use RESTful APIs as standard for external integration.

System 300 also includes model 302. Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., used to interpret requests and analyze data to generate responses, including but not limited to selecting models and/or other components of the modular architecture for serving the request, and/or provide responses in a format that is useful to users).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, the model (e.g., model 302) may automatically perform actions based on outputs 306. In some embodiments, the model (e.g., model 302) may not perform any actions. The output of the model (e.g., model 302) may be used to interpret requests, analyze data to generate responses, including but not limited to selecting models and/or other components of the modular architecture for serving the request, and/or provide responses in a format that is useful to users.

In some embodiments, model 302 may be trained by taking inputs 304 and providing outputs 306. Model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem-solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302, where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., to interpret requests and analyze data to generate responses, including but not limited to selecting models and/or other components of the modular architecture for serving the request, and/or provide responses in a format that is useful to users).

Model 302 is shown as a convolutional neural network. A convolutional neural network consists of an input layer (e.g., input 304), hidden layers, and an output layer (e.g., output 306). As shown in FIG. 3, the middle layers are called hidden because their inputs and outputs are masked by the activation function and final convolution. In a convolutional neural network, the hidden layers include layers that perform convolutions. Model 302 may comprise convolutional layers that convolve the input and pass its result to the next layer. Model 302 includes local and/or global pooling layers along with traditional convolutional layers. Pooling layers reduce the dimensions of data by combining the outputs of neuron clusters at one layer into a single neuron in the next layer. Also, as shown, model 302 may comprise fully connected layers that connect every neuron in one layer to every neuron in another layer.

FIG. 4 shows a flowchart of the steps involved in generating dynamic human-like conversational responses using a modular architecture featuring layered data models with gated neural networks, in accordance with one or more embodiments. For example, the system may use process 400 (e.g., as implemented on one or more system components described above) in order to generate the dynamic human-like conversational responses based on complex data, as described in FIG. 1.

In some embodiments, the system may receive a request for a database query from a chatbot application. For example, a chatbot or chatterbot may be a software application used to conduct an online chat conversation via text or text-to-speech in lieu of providing direct contact with a live human agent. Chatbots may be computer programs that are capable of maintaining a conversation with a user in natural language, understanding their intent, and/or replying based on preset rules and data. In some embodiments, the chatbots may be powered using artificial intelligence. The chatbot may be housed at the API endpoint layer. For example, the system may receive, at an API endpoint layer, a dynamic human-like conversational request. The system may determine, at the API endpoint layer, a database request for the database query based on the dynamic human-like conversational request.

In some embodiments, the system may comprise an API endpoint layer. For example, the system may comprise a common API endpoint layer that includes a prompt library. The prompt library may include a list of available or optimal prompts for given categories of database requests. In some embodiments, the system may determine, at the API endpoint layer, the database request for the database query based on the dynamic human-like conversational request by determining an initial database request for the database query based on the dynamic human-like conversational request. The system may then retrieve a threshold requirement for database requests. The system may then compare the threshold requirement for database requests to the initial database request. The system may then, in response to comparing the threshold requirement for database requests to the initial database request, determine that the initial database request does not correspond to the threshold requirement for database requests. The system may then, in response to determining that the initial database request does not correspond to the threshold requirement for database requests, generate a modified database request for the database query.

Alternatively or additionally, the system may comprise a data model that generates new prompts that meet certain threshold requirements. For example, the system may generate a new prompt based on an inputted prompt and/or request. The prompt, as well as previous prompts, may also be logged in order to train the model. In some embodiments, the system may determine what (or which) prompt has the most utility (e.g., meets the most threshold requirements) for generating a database query. The system may generate the modified database request for the database query by determining, by processing the initial database request through a second normalization layer, a second feature input. The system may then input the second feature input into a prompt generation model. The system may then retrieve a second configuration file for the prompt generation model, wherein the second configuration file defines a parameter for meeting the threshold requirement. The system may then input the second feature input into the prompt generation model to generate the modified database request.

At step 402, process 400 (e.g., using one or more components described herein) receives non-normalized source layer data. For example, the system may receive one or more portions of data from a data source layer (e.g., data source layer 202 (FIG. 2)). In some embodiments, the system may receive a first portion of non-normalized source layer data. For example, the system may receive a first portion of non-normalized source layer data for a first data model, wherein the first data model comprises an aggregated subset of additional data models. Additionally or alternatively, the system may receive a second portion of the non-normalized source layer data. For example, the system may receive a second portion of the non-normalized source layer data for a second data model. Additionally or alternatively, the system may receive a third portion of the non-normalized source layer data. For example, the system may receive a third portion of the non-normalized source layer data for a third data model.

In some embodiments, the first data model may comprise an ensemble function that is trained on the outputs of the second data model and the third data model. For example, the first data model may comprise a data model retrieved from a data model repository. The data model repository may comprise a collection of stored data models and/or models processed by an ensemble function. Ensemble learning refers to algorithms that combine the predictions from two or more models. For example, the system may use bagging, stacking, and/or boosting algorithms.

At step 404, process 400 (e.g., using one or more components described herein) normalizes source layer data to generate feature inputs. For example, the system determines feature inputs based on the non-normalized source layer data. For example, the system may determine, by processing each respective portion through a common normalization layer, a first feature input for the first data model based on the first portion, a second feature input for the second data model based on the second portion, and a third feature input for the third data model based on the third portion. For example, the normalization layer may be trained to determine the I/O of a given component and normalize that I/O into one which is compatible with another component and/or the architecture at large.

In some embodiments, the first normalization layer may process data based on hardware restrictions. For example, tensors are matrixes that are larger than 2 dimensions. GPU hardware is more efficient at processing this type of data. However, many systems (e.g., those processing large amounts of textual data and/or servicing chatbot applications) may rely on CPU infrastructure. Thus, to effectively use models and/or train data for models with more than two dimensionality, CPU systems need to be replaced. As an alternative, the system may train the models for smaller dimensions in order to limit the size of matrixes and thus efficiently use legacy hardware. The system may achieve this by applying a tensor value. Tensor values may comprise numbers of a specific shape and a certain rank (dimensionality). Tensors are used in machine learning to represent input data and output data in models. By using the tensor value (and/or representing extra dimensionality via a tensor value), the system may use legacy hardware efficiently. For example, the system may use a Forward-Forward algorithm for this purpose. The Forward-Forward algorithm replaces the forward and backward passes of backpropagation with two forward passes, one with positive (i.e., real) data and the other with negative data, which could be generated by the network itself. For example, processing each respective portion through the first normalization layer further may comprise receiving each respective portion and applying a tensor value to each respective portion to reduce the dimensionality of each respective portion.

In some embodiments, the system may determine whether or not to use a model based on whether the model fits a given time period and/or is current. To do so, the system may determine an expiration date for the model and compare it to a current date. For example, the system may determine an expiration date for the first data model. The system may compare the expiration date to the current date. The system may determine to use the first data model based on comparing the expiration date to the current date.

At step 406, process 400 (e.g., using one or more components described herein) generates data model outputs based on normalized data. For example, the system may determine outputs based on the feature inputs. For example, the system may input the first feature input into the first data model, the second feature input into the second data model, and the third feature input into the third data model to generate respective outputs.

At step 408, process 400 (e.g., using one or more components described herein) retrieves a configuration file for a gating network. For example, the system may retrieve a first configuration file for a gating network from a first configuration layer, wherein the first configuration file defines one or more parameters for the gating network. The configuration file may comprise one or more parameters that define and/or affect how the gating network operates. In some embodiments, the system may select different configuration files for applying to the gating network. For example, the system may select which configuration file to use based on a request and/or query. For example, the system may select or use a different configuration file to allow for faster updates and/or changes. For example, retrieving the first configuration file for the gating network from the first configuration layer may comprise the system receiving a database request for the database query and selecting the first configuration file from a plurality of configuration files based on the database request.

In some embodiments, the gating network may comprise a gate for a neural network or another data model. For example, the gating network may comprise a gated neural network function that weights the respective outputs based on a coefficient defined by the one or more parameters. The gate in a neural network may act as a threshold for allowing the network to distinguish when to use normal stacked layers versus an identity connection. An identity connection uses the output of lower layers (e.g., the respective outputs of the second data model and the third data model) as an addition to the output of consecutive layers (e.g., the first data model). The gate may allow for the layers of the network to learn in increments rather than creating transformations from scratch. For example, the gate in the neural network is used to decide whether the network can use the shortened identity connections or if it will use the stacked layers.

In some embodiments, the gate in the neural network may use a coefficient used to define how much the network uses the identity connections over the stacked layers (e.g., the respective outputs of the second data model and the third data model versus the first data model). For example, instead of a traditional RNN architecture, with several sequential nodes, the GRU uses several cells consecutively, each containing three models. A gated neural network uses known processes called update gate and reset gate. This allows the neural network to carry information forward across multiple units by storing values in memory. When a critical point is reached, the stored values are used to update the current state.

The gating network may contain four main components: the update gate, the reset gate, the current memory unit, and the final memory unit. The update gate is responsible for updating the weights and eliminating the vanishing gradient problem. As the model learns, the model will continue to update the information to be passed to the future. The reset gate acts in an opposing way by deciding how much of the past information should be forgotten, given the current state.

In some embodiments, the gating network may comprise one or more models, such as an artificial intelligence model, which may include unsupervised or supervised learning. For example, the gating network may comprise a supervised database that comprises a GRU.

At step 410, process 400 (e.g., using one or more components described herein) generates a gating network output based on a configuration file. For example, the system may input the first output, the second output, and the third output into a gating network to generate a gating network output based on the one or more parameters. For example, the system may input the first feature input into the first data model, the second feature input into the second data model, and the third feature input into the third data model to generate respective outputs. For example, the gating network may determine when to use one layer and/or component (or an I/O thereof) versus another layer and/or component (or an I/O thereof).

In some embodiments, the system may dynamically determine which data models to use. For example, by dynamically determining which models to use, the system may conserve processing resources. For example, the system may select which data models to use based on a configuration file. For example, the system may use the selection of different configuration files to allow for faster updates and/or changes to the data models that are used. For example, the system may retrieve a third configuration file for selecting data models. The system may input the second feature input into the prompt generation model to generate the modified database request.

At step 412, process 400 (e.g., using one or more components described herein) determines a database query. The system may then determine, based on the gating network output, a database query. In some embodiments, the system may require the system to meet or enter one or more threshold requirements for database queries. For example, the threshold requirement for database queries may comprise one or more criteria required by the system to generate and/or serve a query. Such criteria may include a source of data, a time range, a domain, and/or other criteria. The system may determine whether these criteria are met. If not, the system may generate a recommendation (which may be expressed via a prompt) for updating the query and/or meeting the requirements.

For example, the system may retrieve a threshold requirement for database queries. The system may compare the threshold requirement for database queries to the database query. In response to comparing the threshold requirement for database queries to the database query, the system may determine that the database query does not correspond to the threshold requirement for database queries. In response to determining that the database query does not correspond to the threshold requirement for database queries, the system may generate a recommendation for the database query.

Alternatively or additionally, the system may determine that a query met all requirements and generate a response. For example, the system may retrieve a threshold requirement for database queries. The system may compare the threshold requirement for database queries to the database query. The system may, in response to comparing the threshold requirement for database queries to the database query, determine that the database query does correspond to the threshold requirement for database queries. The system may, in response to determining that the database query does correspond to the threshold requirement for database queries, determine to generate the dynamic human-like conversational response based on the database query.

At step 414, process 400 (e.g., using one or more components described herein) generates a response based on the database query. For example, the system may generate a dynamic human-like conversational response based on the database query. For example, the modular architecture may use a chatbot application component to receive requests for complex data modeling systems, a normalization layer to interpret the request, a gating network to select one or more data modeling components to analyze data to service the requests, and/or the same (or different chatbot application) to provide a response based on the analyzed data.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to descriptions above could be used to perform one or more of the steps in FIG. 4.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to or used in accordance with other systems and/or methods.

The present techniques will be better understood with reference to the following enumerated embodiments:

1. A method for generating dynamic human-like conversational responses using layered data models with gated neural networks.
2. The method of the preceding embodiment, the method comprising: receiving a first portion of non-normalized source layer data for a first data model, wherein the first data model comprises an aggregated subset of additional data models; receiving a second portion of the non-normalized source layer data for a second data model; receiving a third portion of the non-normalized source layer data for a third data model; determining, by processing each respective portion through a first normalization layer, a first feature input for the first data model based on the first portion, a second feature input for the second data model based on the second portion, and a third feature input for the third data model based on the third portion; inputting the first feature input into the first data model, the second feature input into the second data model, and the third feature input into the third data model to generate a respective output; retrieving a first configuration file for a gating network from a first configuration layer, wherein the first configuration file defines one or more parameters for the gating network; inputting the first output, the second output, and the third output into the gating network to generate a gating network output based on the one or more parameters; determining, based on the gating network output, a database query; and generating a dynamic human-like conversational response based on the database query.

3. The method of any one of the preceding embodiments, wherein retrieving the first configuration file for the gating network from the first configuration layer further comprises: receiving a database request for the database query; and selecting the first configuration file from a plurality of configuration files based on the database request.

4. The method of any one of the preceding embodiments, wherein the gating network comprises a gated neural network function that weights the respective outputs based on a coefficient defined by the one or more parameters.

5. The method of any one of the preceding embodiments, wherein the gating network comprises a supervised data model that uses a gated recurrent unit.

6. The method of any one of the preceding embodiments, further comprising: receiving, at an API endpoint layer, a dynamic human-like conversational request; and determining, at the API endpoint layer, a database request for the database query based on the dynamic human-like conversational request.

7. The method of any one of the preceding embodiments, wherein determining, at the API endpoint layer, the database request for the database query based on the dynamic human-like conversational request further comprises: determining an initial database request for the database query based on the dynamic human-like conversational request; retrieving a threshold requirement for database requests; comparing the threshold requirement for database requests to the initial database request; in response to comparing the threshold requirement for database requests to the initial database request, determining that the initial database request does not correspond to the threshold requirement for database requests; and in response to determining that the initial database request does not correspond to the threshold requirement for database requests, generating a modified database request for the database query.

8. The method of any one of the preceding embodiments, wherein generating the modified database request for the database query further comprises: determining, by processing the initial database request through a second normalization layer, a second feature input; inputting the second feature input into a prompt generation model; retrieving a second configuration file for the prompt generation model, wherein the second configuration file defines a parameter for meeting the threshold requirement; and inputting the second feature input into the prompt generation model to generate the modified database request.

9. The method of any one of the preceding embodiments, further comprising: retrieving a threshold requirement for database queries; comparing the threshold requirement for database queries to the database query; in response to comparing the threshold requirement for database queries to the database query, determining that the database query does not correspond to the threshold requirement for database queries; and in response to determining that the database query does not correspond to the threshold requirement for database queries, generating a recommendation for the database query.

10. The method of any one of the preceding embodiments, further comprising: retrieving a threshold requirement for database queries; comparing the threshold requirement for database queries to the database query; in response to comparing the threshold requirement for database queries to the database query, determining that the database query does correspond to the threshold requirement for database queries; and in response to determining that the database query does correspond to the threshold requirement for database queries, determining to generate the dynamic human-like conversational response based on the database query.

11. The method of any one of the preceding embodiments, wherein a first data model comprises an ensemble function that is trained on outputs of the second data model and the third data model.

12. The method of any one of the preceding embodiments, wherein processing each respective portion through the first normalization layer further comprises: receiving each respective portion; and applying a tensor value to each respective portion to reduce the dimensionality of each respective portion.

13. The method of any one of the preceding embodiments, wherein receiving the first portion of non-normalized source layer data for the first data model further comprises: determining an expiration date for the first data model; comparing the expiration date to a current date; and determining to use the first data model based on comparing the expiration date to the current date.

14. The method of any one of the preceding embodiments, further comprising: retrieving a third configuration file for selecting data models; and inputting the second feature input into the prompt generation model to generate the modified database request.

15. A tangible, non-transitory, machine-readable medium storing instructions that, when executed by a data processing apparatus, cause the data processing apparatus to perform operations comprising those of any of embodiments 1-14.

16. A system comprising one or more processors; and memory-storing instructions that, when executed by the processors, cause the processors to effectuate operations comprising those of any of embodiments 1-14.

17. A system comprising means for performing any of embodiments 1-14.

What is claimed is:

1. A system for generating dynamic human-like conversational responses using layered data models with gated neural networks, the system comprising:
   one or more processors; and
   a non-transitory computer-readable media comprising of instructions that, when executed by the one or more processors, cause operations comprising:
      receiving, at an Application Programming Interface endpoint layer, a dynamic human-like conversational request for a database query, wherein the dynamic human-like conversational request comprises an input to a chatbot application;

determining, at the Application Programming Interface endpoint layer, a database request for the database query based on the dynamic human-like conversational request, wherein the database request comprises a first prompt from a prompt library for the Application Programming Interface endpoint layer;

retrieving a threshold requirement for the database request;

comparing the threshold requirement to the database request;

in response to comparing the threshold requirement the database request, determining that the database request does not correspond to the threshold requirement; and in response to determining that the database request does not correspond to the threshold requirement, generating a modified database request for the database query;

in response to the modified database request, receiving a first portion of non-normalized source layer data for a first data model, wherein the first data model comprises an aggregated subset of additional data models;

receiving a second portion of the non-normalized source layer data for a second data model, wherein the second data model is trained on a first set of training data;

determining, by processing each respective portion through a first normalization layer, a first feature input for the first data model based on the first portion and a second feature input for the second data model based on the second portion;

inputting the first feature input into the first data model and the second feature input into the second data model to generate respective outputs;

retrieving a first configuration file for a gating network from a first configuration layer, wherein the first configuration file defines one or more parameters for normalizing the gating network;

inputting the respective outputs into the gating network to generate a normalized gating network output based on the one or more parameters;

determining, based on the normalized gating network output, the database query; and generating a dynamic human-like conversational response based on the database query.

2. A method for generating dynamic human-like conversational responses using layered data models with gated neural networks, the method comprising:

receiving, at an Application Programming Interface endpoint layer, a dynamic human-like conversational request, wherein the dynamic human-like conversational request comprises an input to a chatbot application;

determining, at the Application Programming Interface endpoint layer, a database request for a database query based on the dynamic human-like conversational request, wherein the database request comprises a first prompt from a prompt library for the Application Programming Interface endpoint layer;

retrieving a threshold requirement for the database request;

comparing the threshold requirement to the database request;

in response to comparing the threshold requirement the database request, determining that the database request does not correspond to the threshold requirement; and in response to determining that the database request does not correspond to the threshold requirement, generating a modified database request for the database query;

in response to the modified database request, receiving a first portion of non-normalized source layer data for a first data model, wherein the first data model comprises an aggregated subset of additional data models;

receiving a second portion of the non-normalized source layer data for a second data model;

determining, by processing each respective portion through a first normalization layer, a first feature input for the first data model based on the first portion and a second feature input for the second data model based on the second portion;

inputting the first feature input into the first data model and the second feature input into the second data model to generate respective outputs;

retrieving a first configuration file for a gating network from a first configuration layer, wherein the first configuration file defines one or more parameters for normalizing the gating network;

inputting the respective outputs into the gating network to generate a normalized gating network output based on the one or more parameters;

determining, based on the normalized gating network output, the database query; and generating a dynamic human-like conversational response based on the database query.

3. The method of claim 2, wherein retrieving the first configuration file for the gating network from the first configuration layer, further comprises:

receiving a database request for the database query; and selecting the first configuration file from a plurality of configuration files based on the database request.

4. The method of claim 2, wherein the gating network comprises a gated neural network function that weights the respective outputs based on a coefficient defined by the one or more parameters.

5. The method of claim 2, wherein the gating network comprises a supervised data model that uses a gated recurrent unit.

6. The method of claim 2, wherein generating the modified database request for the database query, further comprises:

determining, by processing the initial database request through a second normalization layer, a second feature input;

inputting the second feature input into a prompt generation model;

retrieving a second configuration file for the prompt generation model, wherein the second configuration file defines a parameter for meeting the threshold requirement; and inputting the second feature input into the prompt generation model to generate the modified database request.

7. The method of claim 2, further comprising:

retrieving a threshold requirement for database queries;

comparing the threshold requirement for database queries to the database query;

in response to comparing the threshold requirement for database queries to the database query, determining that the database query does not correspond to the threshold requirement for database queries; and in response to determining that the database query does not correspond to the threshold requirement for database queries, generating a recommendation for the database query.

8. The method of claim 2, further comprising:
retrieving a threshold requirement for database queries;
comparing the threshold requirement for database queries to the database query;
in response to comparing the threshold requirement for database queries to the database query, determining that the database query does correspond to the threshold requirement for database queries; and
in response to determining that the database query does correspond to the threshold requirement for database queries, determining to generate the dynamic human-like conversational response based on the database query.

9. The method of claim 2, wherein first data model comprises an ensemble function that is trained on outputs of the second data model and a third data model.

10. The method of claim 2, wherein processing each respective portion through the first normalization layer, further comprises:
receiving each respective portion; and
applying a tensor value to each respective portion to reduce a dimensionality of each respective portion.

11. The method of claim 2, wherein receiving the first portion of non-normalized source layer data for the first data model, further comprises:
determining an expiration date for the first data model;
comparing the expiration date to a current date; and
determining to use the first data model based on comparing the expiration date to the current date.

12. The method of claim 2, further comprising:
retrieving a second configuration file for selecting data models; and
inputting the second feature input into a prompt generation model to generate a modified database request.

13. A non-transitory, computer-readable medium comprising of instructions that, when executed by one or more processors, cause operations comprising:
receiving, at an Application Programming Interface endpoint layer, a dynamic human-like conversational request, wherein the dynamic human-like conversational request comprises an input to a chatbot application;
determining, at the Application Programming Interface endpoint layer, a database request for a database query based on the dynamic human-like conversational request, wherein the database request comprises a first prompt from a prompt library for the Application Programming Interface endpoint layer;
retrieving a threshold requirement for the database request;
comparing the threshold requirement to the database request;
in response to comparing the threshold requirement the database request, determining that the database request does not correspond to the threshold requirement;
in response to determining that the database request does not correspond to the threshold requirement, generating a modified database request for the database query;
in response to the modified database request, processing a first portion of non-normalized source layer data through a first data model, wherein the first data model comprises an aggregated subset of additional data models;
processing a second portion of the non-normalized source layer data through a second data model;
generating respective outputs from the first data model and the second data model by:
determining a first feature input for the first data model based on the first portion and a second feature input for the second data model based on the second portion; and
inputting the first feature input into the first data model and the second feature input into the second data model;
retrieving a first configuration file for a gating network from a first configuration layer, wherein the first configuration file defines one or more parameters for normalizing the gating network;
inputting the respective outputs into the gating network to generate a normalized gating network output based on the one or more parameters;
determining, based on the normalized gating network output, the database query; and
generating a dynamic human-like conversational response based on the database query.

14. The non-transitory, computer-readable medium of claim 13, wherein retrieving the first configuration file for the gating network from the first configuration layer further comprises:
receiving a database request for the database query; and
selecting the first configuration file from a plurality of configuration files based on the database request.

15. The non-transitory, computer-readable medium of claim 13, wherein the gating network comprises a gated neural network function that weights the respective outputs based on a coefficient defined by the one or more parameters.

16. The non-transitory, computer-readable medium of claim 13, wherein the gating network comprises a supervised data model that uses a gated recurrent unit.

* * * * *